…

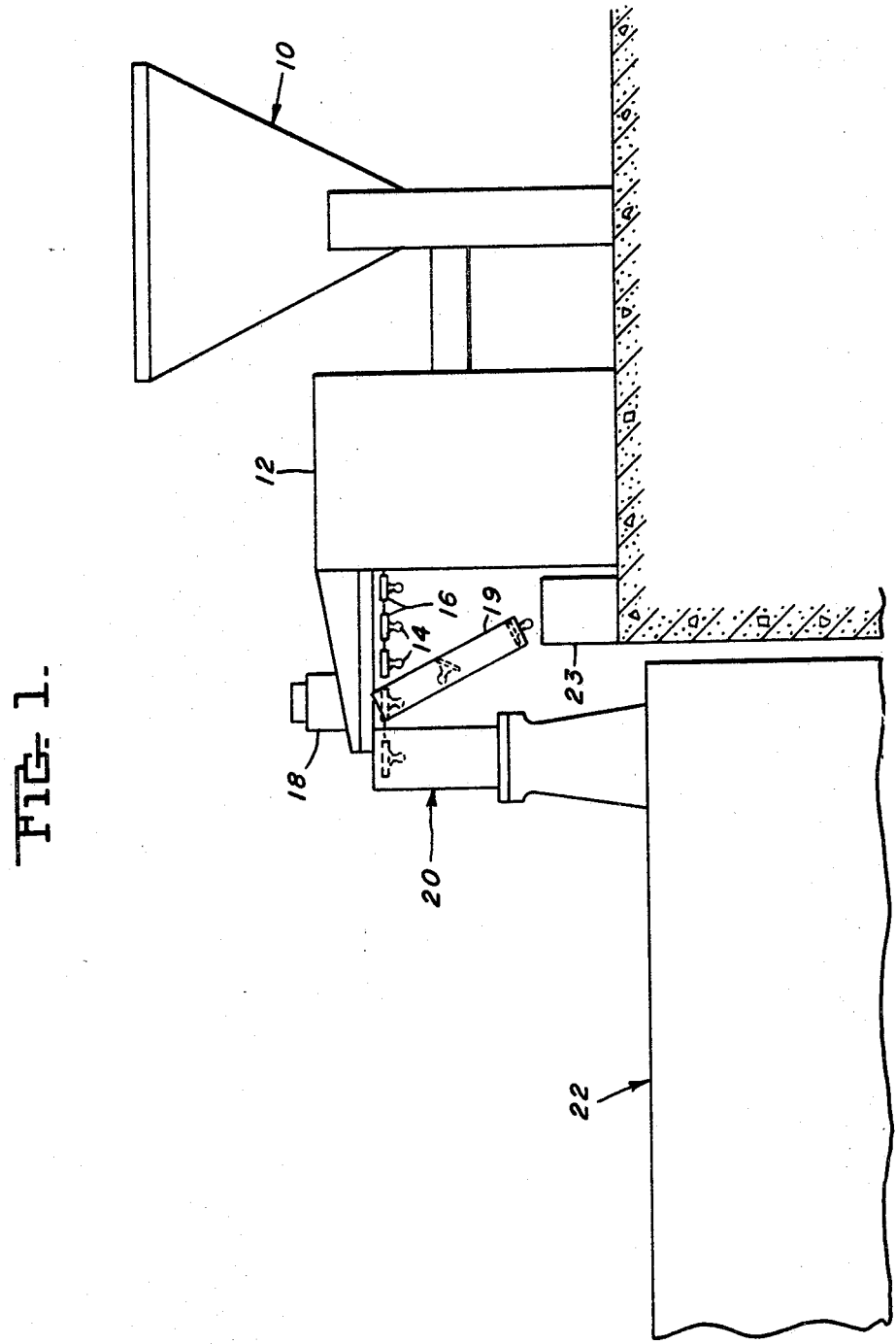

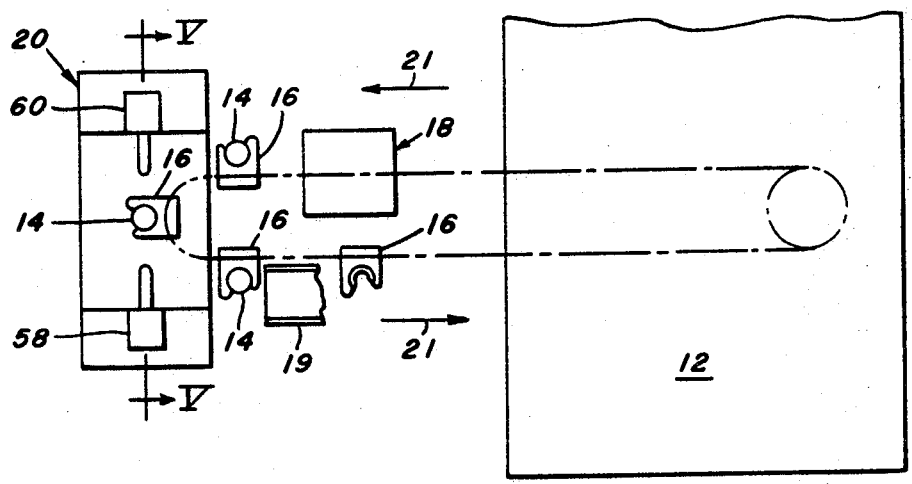
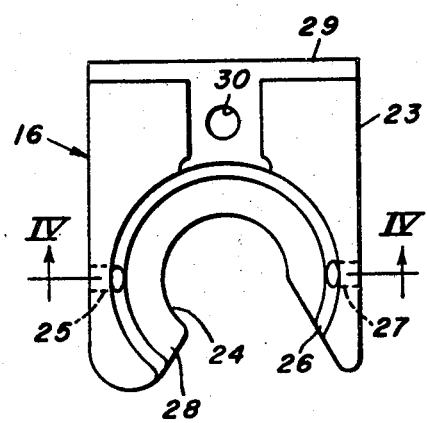
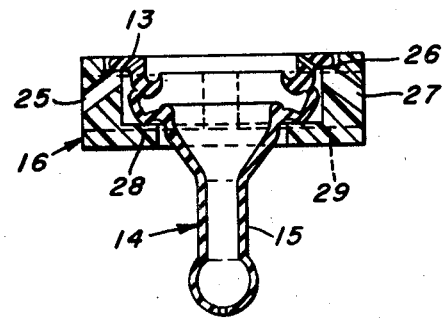

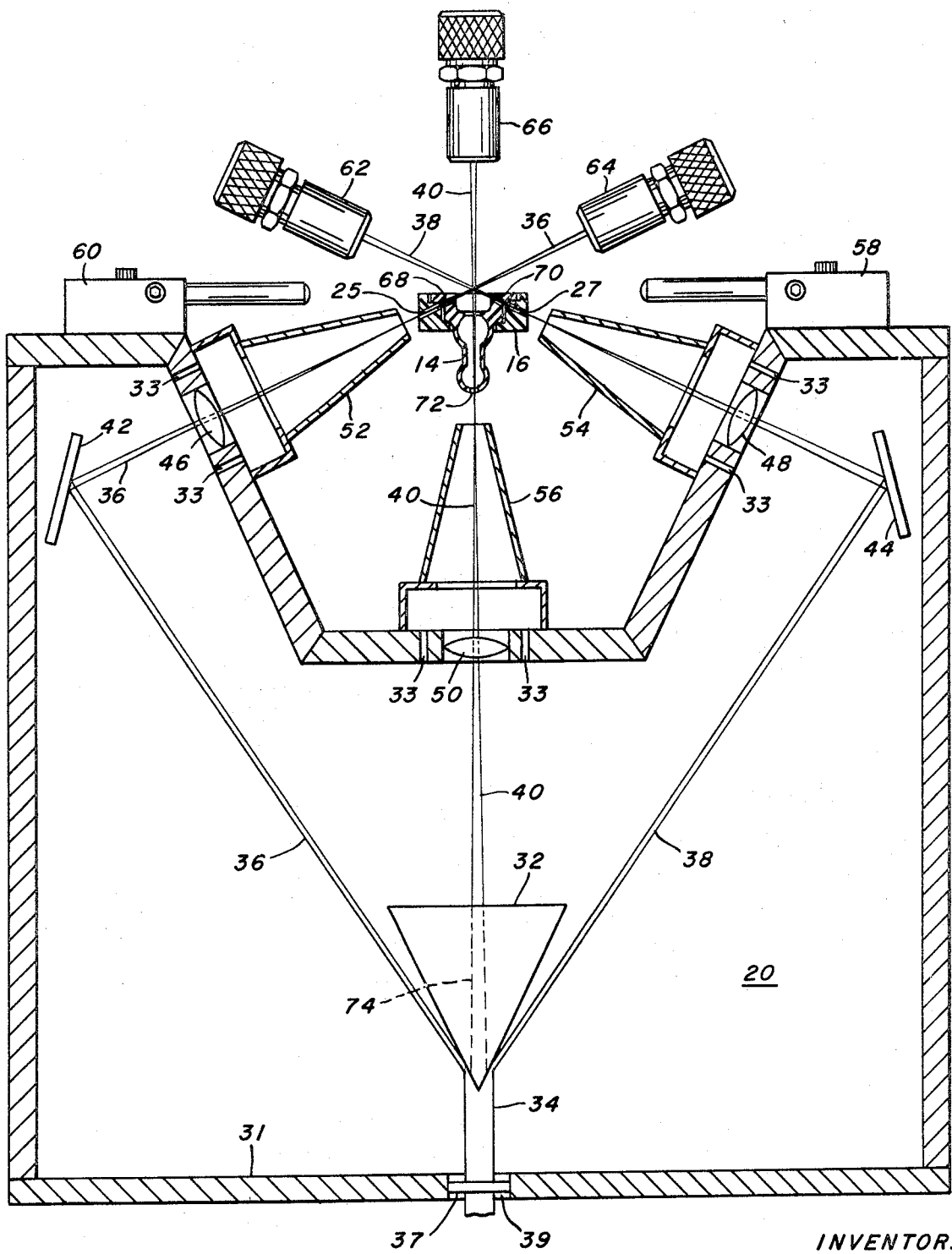

United States Patent Office 3,524,046
Patented Aug. 11, 1970

3,524,046
APPARATUS AND METHOD FOR PIERCING HOLES IN ELASTOMERIC ARTICLES
Nicolaas L. Brouwer, Apollo, Pa., assignor to Aluminum Company of America, Pittsburgh, Pa., a corporation of Pennsylvania
Filed Apr. 26, 1968, Ser. No. 724,550
Int. Cl. H05b 7/18
U.S. Cl. 219—384    8 Claims

ABSTRACT OF THE DISCLOSURE

Apparatus is provided for piercing holes in elastomeric articles such as nipples wherein the articles are positioned in supports adapted to receive and seat the same, and these supports are indexed seriatim to present each article to a laser which fires a laser beam to pierce one or more holes in the elastomeric article or nipple. Sensing apparatus may also be provided for indicating whether a nipple is correctly positioned in the support, and for indicating whether the hole has been pierced so that appropriate corrective measures can be taken.

BACKGROUND OF THE INVENTION

Heretofore, holes in elastomeric nipples have typically been formed by piercing the nipples with either a hot needle or a mechanical punch. This piercing operation has usually been done by hand or by a mechanical device. The holes in the nipples are sometimes sealed over by melted rubber or plastic after the needle is withdrawn therefrom, or may be clogged by residue left by the punch. Inspection of the nipples to insure that the holes are open has usually been visual. With the advent of the throw away, prefilled baby bottle, the methods heretofore commonly used for piercing the holes have become inadequate in that they cannot be expected to meet the increased demand for nipples.

SUMMARY OF THE INVENTION

According to the present invention, one or more holes are pierced in successively supplied elastomeric articles of predetermined shape such as nipples for baby bottles by means of a laser, preferably one which produces a high energy beam having a wave length in the range of ten to eleven microns, to vaporize the material of an article where it is desired to form a hole or holes therein. The elastomeric articles are placed in a predetermined orientation and positioned in individual collar-shaped supports, and the supports are indexed seriatim to move them into a predetermined position with respect to the laser and a piercing head thereon. The laser is then actuated to produce a laser beam firing through the predetermined position to produce at least one hole in each article. After the holes are pierced by the laser beam, the supports with the elastomeric articles therein are indexed to a removing means such as an air jet which blows the articles out of the supports so that they drop into a storage bin, conveyor or the like. The invention also includes sensing means such as photoelectric cells or interruptable air jet, position sensors which detect whether the articles are properly oriented and positioned in the collar-shaped supports, and means for sensing the transmission of the laser beam through the articles to indicate whether the desired holes or holes have been pierced in the nipples.

Accordingly, an object of this invention is to provide improved apparatus for producing holes in elastomeric articles.

Another object of the invention is to provide high speed apparatus for orienting elastomeric articles and presenting them to a laser which pierces at least one hole in each article.

A further object is to provid eapparatus for piercing holes in elastomeric articles including detecting devices for indicating the correct positioning of an article and for determining whether the desired hole has been pierced in each such article.

A further object is to provide apparatus for piercing method of piercing holes in elastomeric articles in which a laser beam is employed to pierce the holes in the articles.

These and other objects will be more fully understood and appreciated from the following description with reference to the illustrations appended hereto.

DESCRIPTION OF PREFERRED EMBODIMENT

FIG. 1 is a side elevational view of the apparatus employed in the practice of the invention.

FIG. 2 is a top plan view of the piercing head showing the path that the nipple supports and nipples follow in being presented to the piercing head.

FIG. 3 is a top plan view of a nipple support.

FIG. 4 is a cross-sectional view of the nipple support taken along line IV—IV of FIG. 3, with a nipple positioned in the support.

FIG. 5 is a cross-sectional view taken along line V—V of FIG. 2 showing the piercing head and laser beam splitting optics for piercing a nipple.

Referring now to the drawings, apparatus is illustrated for handling and orienting elastomeric articles of predetermined shape and presenting such articles seriatim to a laser which pierces at least one hole in each article. For the purpose of the description, a nipple for a baby bottle or the like is illustrated. Included in the general class of elastomeric materials of which the articles may be formed are any of the natural or synthetic rubbers and latex materials as well as the plastics having an elastic or resilient quality.

Referring to FIGS. 1 and 2, a preferred embodiment of the apparatus for the practice of this invention includes a vibratory hopper 10 into which nipples are loaded so that they may be fed into the unscrambler device 12 which orients the nipples 14 and positions each nipple on an individual support 16. The vibratory hopper 10 and unscrambler 12 can be any of several conventional apparatus available for such purposes or, in the alternative, the positioning of nipples 14 in supports 16 can be done manually. In the preferred embodiment the unscrambler 12 is a rotary, vacuum drum device similar to that described in United States Letters Patent 3,204,750, which is adapted to position nipples in the supports at a rate of approximately 250 per minute.

The collar-shaped supports 16 in which the nipples 14 are positioned are mounted on a continuous chain, not shown, which is indexed by an indexer 18 along path 21, as indicated by the arrows. The chain moves the supports from the unscrambler 12 to the piercing head 20 to present the nipples 14 to a laser beam generated by a laser contained in enclosure 22. A chute 19 is also provided through which the nipples are fed into a hopper 23 when ejected from the supports by an ejection means such as an air jet or the like, not shown.

Referring to FIGS. 3 and 4, a collar-shaped support 16 is shown in detail, as comprising a rectangular block 23 with a hole 24 through one end thereof having an upper counter-sink 26 and a lower lip 28 for supporting a nipple 14 having a flanged base 13 and a cylindrical teat portion 15. The near end of the support 16 is partially open leading into the hole 24 so that the teat portion 15 of a nipple can be dropped or passed through the opening and into the hole 24 during the positioning of the nipple in the support 16 in the rotary drum 12. The opening is not wide enough, however, for the flanged base 13 of the nipple, once seated, to slide out of the hole 24 unless force is applied thereto. The supports are preferably made of nylon or other plastic material against which an elastomeric nipple will easily slide so that the force of gravity and the slight inherent vibration of the apparatus will insure that a nipple will drop into proper position in the supports during handling. Apertures 25 and 27 are provided in the supports 16 for laser beams to pass through, and an attachment hole 30 is provided for affixation of the supports to a continuous chain, not shown. The supports also preferably have a projecting runner 29 to guide them as they are indexed through the rotary drum 12 and to the piercing head 20.

In FIG. 5 the piercing head 20 is shown as comprising a gas-tight compartment 31 containing a laser beam splitting device such as the optical wedge 32 for separating a laser beam 34 into three component beams 36, 38 and 40, two front-surfaced mirrors 42 and 44 for directing beam components 36 and 38 towards the nipple 14, three optical lenses 46, 48 and 50 for focusing the three beam components to obtain proper hole diameters, and three cones 52, 54 and 56 for shielding the beam components and protecting the optical lenses 46, 48 and 50. Adjustment screws, not shown, are provided for the wedge 32, the mirrors 42 and 44 and the three lenses 46, 48 and 50 to facilitate adjustment thereof for aligning and balancing the beam components. It is noted that in the preferred embodiment, means not shown is also provided for introducing purging gas or air into compartment 31 so that it can escape through a plurality of holes 33 around the base of the cones 52, 54 and 56 and through the cones to insure that elastomeric dust or the like does not enter compartment 31 and collect on the optics contained therein. A transparent shield 37 is located in aperture 39 through which laser beam 34 passes to prevent purging air from escaping therethrough.

The piercing head 20 also includes a photocell light source 58 which directs a beam of light above and across the support and a photocell receiver 60 for receiving this beam of light and sensing whether the nipple is in correct orientation and position before actuating the laser. Also included in the optical head are three sensing units 62, 64 and 66 for sensing the energy of laser beam components 36, 38 and 40 after they have passed through a nipple for determining whether the desired holes have been pierced in the nipple. These sensing units 62, 64 and 66 are infra-red detectors and are available under the trademark "Servo-Therm." Although not shown, the piercing head 20 is also shielded by conventional means to protect the operator from the invisible laser beam, and is vented to permit and control the escape of vaporized elastomeric material from the apparatus.

In the preferred embodiment, particularly as applied to piercing latex nipples, a $CO_2$ laser has been selected for piercing the holes in nipples. It is known that latex absorbs a higher percentage of energy in the range of 10–11 microns wave length, and a $CO_2$ laser produces energy at 10.6 microns. Consequently, the energy from the $CO_2$ laser beam is absorbed by the latex to vaporize the same and produce the desired holes therein rather than being in large part reflected as would laser energy at other wave lengths. The $CO_2$ laser is known in the art and contains carbon dioxide, nitrogen and helium as the effective lasing constituents. It is noted that for articles made from elastomeric materials other than latex, lasers, other than the carbon dioxide laser may be more efficient as the laser energy source. Desirably, the energy provided by such lasers has a wave length that is readily absorbed by the articles to be pierced.

The $CO_2$ laser in the preferred embodiment operates in a high speed pulsed mode and produces a beam of invisible energy of approximately one-half inch diameter and 30 to 40 watts of average power, with 10–15 kilowatts of peak power. This is sufficient power to permit the beam to be divided into a plurality of beam components to pierce simultaneously a plurality of holes. By focussing the beam, or the beam components if a plurality of holes are to be pierced, through optical lenses, the peak power per unit area at the focal point thereof is of such intensity that the energy of the laser completely vaporizes the elastomeric material positioned near the focal point to produce a hole or a plurality of holes in the material. In the apparatus herein described, three holes 68, 70 and 72 of approximately 0.012 inch diameter are simultaneously pierced in a nipple in approximately 100 milliseconds.

The optical wedge 32 separates the one-half inch laser beam 34 into three separate beams 36, 38 and 40 for piercing three holes in the nipples. The optical wedge 32 may be a simple metal wedge with polished surfaces, and a small hole 74 through its center. When the beam 34 is directed at, and axially aligned with, hole 74, approximately one-third of the beam passes through the hole as beam component 40 and one-third will be reflected to each side of the wedge as beam components 36 and 38. The adjustment screws, not shown, permit alignment of the wedge for balancing the three beam components.

Alternatively, the beam 34 may be subdivided by means of appropriately chosen semi-transparent mirrors designed to reflect part of a beam directed thereat and to pass the remainder of the beam. These semi-transparent mirrors are known in the optical art and are partially surface coated to permit only part of the beam to pass therethrough. Such apparatus could include a first semi-transparent mirror disposed at an angle to the beam 34 and designed to pass approximately two-thirds of a beam and reflect the remaining one-third of the beam laterally, and a second semi-transparent mirror aligned with the first such mirror, disposed at an angle to the beam 34 and designed to pass one-half of the remaining two-thirds of the beam and reflect the other one-half of the remaining beam laterally. Using this arrangement, the beam would be divided or split into three approximately equal components much the same as the beam is split by the wedge 32 in FIG. 5. The semi-transparent mirrors are sometimes preferred over an optical wedge because such mirrors divide a laser beam into component beams of approximately equal intensity regardless of the location of areas of concentrated energy within the beam that might affect the relative power of beam components split by an optical wedge.

In the operation of the subject apparatus, the elastomeric nipples 14 to be pierced are loaded into hopper 10 (FIG. 1) which vibrates to feed the nipples by the force of gravity into the rotary vacuum drum 12. The rotary drum 12 positions the nipples 14 in the supports 16 as the supports are successively indexed through the drum by the indexer 18. The supports 16 with the nipples 14 therein are then indexed as shown in FIG. 2 to move the nipples seriatim into a predetermined position in the piercing head 20.

When the indexer 18 stops each support 16 seriatim in the piercing head 20 as shown in FIG. 5, automatic controls not shown actuate the photocell light source 58 to shoot a beam of light across and above the surface of the support. If the nipple 14 is properly seated in the predetermined position in the support 16, the beam of light sent out by the photocell light source will pass over the support and nipple uninterrupted, and will be received by the photocell receiver 60. The receiver then signals the automatic controls to actuate the laser contained in enclosure 22 to produce a laser beam. If, however, the receiver 60 does not receive the light because of an improperly seated nipple, the automatic controls will actuate the indexer to index the supports without the laser being fired. It is noted that this operation of assuring the proper positioning can also be accomplished by one or more means for directing a jet of air towards the nipple and reading the assistance met by the air as a function of the nipple position to either fire or not fire the laser. Such means is known in the art as an interruptable air jet, position sensor.

When the laser is actuated, it fires an instantaneous beam of invisible laser energy 34 at the optical wedge 32. The optical wedge 32 splits the beam 34 into three components 36, 38 and 40 which are directed at the nipple by means of mirrors 42 and 44, and focussed by means of lenses 46, 48 and 50. The three optical lenses 46, 48 and 50 are appropriately chosen and located so that the laser beams which pass through them are each converged to produce a beam of very high intensity energy at the location of the holes to be pierced.

In the proper operation of the apparatus, the three components of high intensity laser energy should pass through the holes 24, 25 and 27 in the nipple support and through the nipple to pierce simultaneously the desired vent holes 68 and 70 in nipple base and feed hole 72 in center of the teat portion, and then strike the beam detectors 62, 64 and 66. If there has been a malfunction in the piercing procedure and the beam detectors 62, 64 and 66 do not receive at least the center beam component 40 and one of the side beam components 36 or 38 (the nipples are acceptable even though there is only one vent hole 68 or 70), the controls automatically stop the apparatus so that the cause of the malfunction can be corrected by the operator. Once the malfunction has been corrected, the operator then starts the apparatus to index the supports and nipples through the optical head and pierce the desired holes in the nipples.

After each nipple is indexed through the piercing head and the separate holes pierced therein, the nipples are indexed seriatim to a removing means such as a jet of air which ejects the nipples from the supports so that they fall through the chute 19 and into a collection means such as a hopper 23 or into a conveyor that carries them to the next operation. If, as mentioned above, the automatic controls did not fire the laser because a nipple was improperly seated in its support, the removing means also does not operate to eject this nipple from its support as it is indexed to the removing means. When this happens, the nipple is carried by its support around the complete path 21, through the rotary drum 12 and back to the laser. In practice, it has been found that an improperly seated nipple will usually be vibrated into proper seating by this recycling, and the sensing means will so indicate and will fire the laser. If not properly seated the second, or third or more times around, it will continue the cycle until proper seating has occurred so that it may be pierced.

As mentioned above, the conventional rotary drum unscrambler employed in the subject apparatus is capable of positioning nipples in supports at a rate of approximately 250 nipples per minute. The laser has a potential of firing up to 400 times per minute. Accordingly, the automatic controls for the apparatus hereinabove described are set to operate the indexer to index the continuous chain and supports at the rate of 250 movements per minute as controlled by the unscrambler. The apparatus is capable of continuous operation for sustained periods of time with few or no adjustments required, and to pierce millions of nipples within relatively short periods.

It will be apparent to those versed in the art to which the invention is addressed that particular embodiments have been selected for purposes of specific illustration and description, and it will be further understood that numerous variations of the structural details of the selected embodiments hereinabove described may be made within the intended scope of the invention without departing from the scope of the appended claims.

What is claimed is:
1. A method for piercing holes in articles of predetermined shape comprising the steps of:
  (a) placing successively supplied articles in a predetermined orientation;
  (b) moving the so oriented articles successively into and out of a predetermined position with respect to a laser;
  (c) upon moving each of said articles into said predetermined position, actuating the laser to produce a laser beam firing through said position to pierce a hole at a desired location in the article present in said position; and
  (d) determining whether said laser beam has pierced a hole in each article by sensing its transmission therethrough.

2. A method as set forth in claim 1 including dividing the laser beam into a plurality of component beams each of which is directed through said predetermined position for simultaneously piercing separate holes in each article.

3. A method as set forth in claim 1 including, before actuating said laser, sensing the presence of each of said articles when in the aforesaid orientation and position with respect to the laser.

4. A method as set forth in claim 1 in which said articles are elastomeric nipples having a flanged base and a cylindrical teat portion, and in which said laser beam is divided into at least two component beams, one of which is directed through said teat portion to pierce a feed hole therein, and another of which is directed through said flanged base to pierce a vent hole therein.

5. Apparatus for piercing holes in articles of predetermined shape comprising:
  (a) means for placing successively supplied articles in a predetermined orientation;
  (b) means for moving the oriented articles successively into and out of a predetermined position;
  (c) a laser for producing a laser beam firing through said position to pierce a hole at a desired location in an article present in said position; and
  (d) means for determining whether the laser beam has pierced a hole in each article by sensing the beam's transmission through the article.

6. Apparatus as set forth in claim 5 in which means is provided to divide said laser beam into a plurality of component beams each of which is directed through said predetermined position for simultaneously piercing separate holes in each article.

7. Apparatus as set forth in claim 5 in which means is provided for sensing the presence of each of said articles when in the aforesaid orientation and position with respect to the laser.

8. Apparatus for piercing holes in elastomeric nipples comprising:
  (a) means for placing successively supplied nipples in a predetermined orientation;
  (b) means for supporting the so oriented nipples;
  (c) means for indexing said supporting means with the nipples thereon to move them succesively into and out of a predetermined position;
  (d) means for sensing the presence of each of said nipples when in the aforesaid orientation and position;
  (e) a carbon dioxide laser for producing a laser beam firing through said predetermined position to pierce a hole at a desired location in a nipple present in said position;
  (f) means for determining whether the laser beam has pierced a hole in the elastomeric nipple by sensing the beam's transmission through the nipple; and
  (g) means for successively removing the elastomeric nipples from the supporting means after a hole has been pierced therein.

(References on following page)

References Cited

UNITED STATES PATENTS

| | | | |
|---|---|---|---|
| 682,626 | 9/1901 | Lockwood | 83—267 X |
| 2,620,428 | 12/1952 | De Green | 83—170 |
| 3,226,527 | 12/1965 | Harding | 219—384 |
| 3,410,979 | 11/1968 | Larsson | 219—68 |
| 2,528,157 | 10/1950 | Menke | 219—384 |
| 3,265,855 | 8/1966 | Norton | 219—121 |
| 3,369,101 | 2/1968 | Di Curcio | 219—121 |
| 3,419,321 | 12/1968 | Barber et al. | 219—384 X |

FOREIGN PATENTS

| | | |
|---|---|---|
| 430,177 | 8/1967 | Switzerland. |

OTHER REFERENCES

IBM Technical Disclosure Bulletin, "Prism Deflector for Laser Machining" by Kremen, vol. 8, No. 6 November, 1965, pp. 882, 219–121.

German printed application, Ser. No. F 16502 VIIId/21h, Farines, Feb. 23, 1956, 219–383.

VOLODYMYR Y. MAYEWSKY, Primary Examiner

U.S. Cl. X.R.

29—235.5; 83—170, 267; 219—121; 222—490